United States Patent Office 3,410,843
Patented Nov. 12, 1968

3,410,843
ε-CAPROIMIDO PYRIMIDINES
Edward W. Pietrusza, Morris Township, Morris County, and Rudolph Pinter, Morristown, N.J., assignors to Allied Chemical Corporation, New York, N.Y., a corporation of New York
No Drawing. Continuation-in-part of application Ser. No. 188,960, Apr. 20, 1962. This application Mar. 10, 1966, Ser. No. 533,235
The portion of the term of the patent subsequent to May 3, 1983, has been disclaimed
5 Claims. (Cl. 260—239.3)

ABSTRACT OF THE DISCLOSURE

The present invention relates to the preparation of the ε-caproimido pyrimidines from substituted pyrimidines and metal salts of ε-caprolactam. These pyrimidines are useful in promoting the polymerization of lactams as described in the above-mentioned copending application. Particularly outstanding as a promoter is 2,4,6-tri-(ε-caproimido) pyrimidine which is a novel compound.

---

This application is a continuation-in-part of our copending U.S. application Ser. No. 188,960, filed Apr. 20, 1962, now U.S. Patent 3,249,590.

With the utilization of the promoters of the invention, polymerization of lactams can be effected at temperatures below the softening point of the resulting polymer. It is well known that in the polymerization of ε-caprolactam, a chemical equilibrium is found between low molecular weight materials and the polymer. At temperatures in excess of the softening point of poly-ε-caprolactam, the presence of appreciable quantities of monomeric ε-caprolactam and its dimers and trimers is permitted by the equilibrium, whereas below said temperature the formation of the polymer is more highly favored. Thus the use of our promoters obviates purification of the product polymer which is usually required before a polycaproamide formed at high temperature can be employed industrially.

In addition, the polycaproamides produced in accordance with our invention contain pyrimido end groups and, accordingly, are inherently more stable than, for example, polycaproamides formed by acid catalysts toward oxidation and heat.

We have discovered that the above pyrimidines are produced by heating a metal salt of ε-caprolactam and a pyrimidine, i.e., a 1,3-diazine, which bears on one of its 2-, 4- and 6-positions a substituent attached by a more electronegative atom than the nitrogen of lactam, hence being replaceable by metathesis with the metal salt of ε-caprolactam, and on the remaining carbon atoms of the ring bears such replaceable substituent or hydrogen or a substituent inert toward the metal salt of ε-caprolactam.

By metathesis, the metal from the lactam salt combines with the replaceable substituents present on at least one of the 2-, 4- and 6-positions, and the lactam residue replaces said substituents. Substituents replaceable by this metathesis include halogen atoms and substituents attached to a carbon atom of the pyrimidine ring by an oxygen atom. Illustrative of such replaceable substituents are: chloro, hydroxy, alkoxy, aryloxy, arylalkoxy, cycloalkoxy, alkylamine, arylamine, arylalkylamino, and alkylamino. Where it is desired to obtain reaction at all of the 2-, 4- and 6- positions in order to prepare a 2,4,6-tri-(ε-caproimido) pyrimidine, it is advantageous to employ as the replaceable substituents chloro, methoxy or phenoxy.

The nitrogen in the 1- and 3-positions on the pyrimidine ring strongly direct ortho and para substitution while exercising a powerful deactivating influence on the 5-position. Therefore, no metathesis occurs with the substituent on the 5-position which is meta-oriented with respect to both nitrogens, even when this is chloro, phenoxy, or other substituents of the above-described replaceable type.

The promoters can be prepared for the purpose of isolation by heating in a diluent such as benzene a metal salt of the caprolactam and a pyrimidine which bears on its carbon atoms substituents chosen in the above-described manner. The metal salt of the ε-caprolactam will ordinarily be prepared by heating, with ε-caprolactam, a strong base such as an alkali or alkaline earth metal, including magnesium, or hydride or amide or hydroxide thereof, or the metal oxide or salt of a weak acid. Such reaction is illustrated by the following Equation I:

(I)
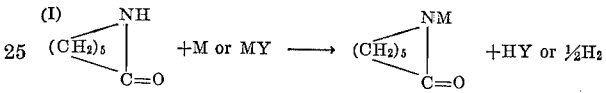

where M is an alkali metal such as lithium, sodium, potassium, rubidium, cesium; or alloy thereof; or alkaline earth metal such as calcium and including magnesium; and Y is an anionic species such as hydride, hydroxide, carbonate, amide, oxide, salt of carboxylic acid, and those carbanions derived from such hydrocarbon species as alkanes, cycloalkanes, arylalkanes and the benzenoids. Illustrative examples of the last-named species of anions are

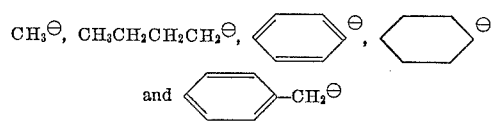

Suitably, the salt-forming metal or compound is admixed under anhydrous conditions with the lactam to form a reaction mixture comprising from about 0.1 to about 1.0, advantageously from about 0.5 to about 0.9 equivalent, of said metal per molecular proportion of lactam. While these ratios of reactants are preferred, a large excess of lactam can be present. The temperature of the mixture is brought to a level at which interaction is complete between salt-forming metal or compound and the lactam. Suitable temperatures are in the range from about 90° C. to about 130° C.

The metal salts are relatively stable at temperatures of 20°–25° C. for a period of at least one month and even at higher temperatures, e.g., 90° C., the time of stability is about four days. Accordingly, the salt can be prepared and stored if desired.

The addition of a substituted pyrimidine to the caprolactam metal salt produced by the process illustrated in Equation I results in the formation of an ε-caproimido pyrimidine as illustrated by the following Equation II:

(II)
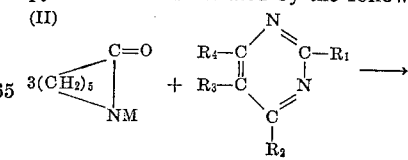

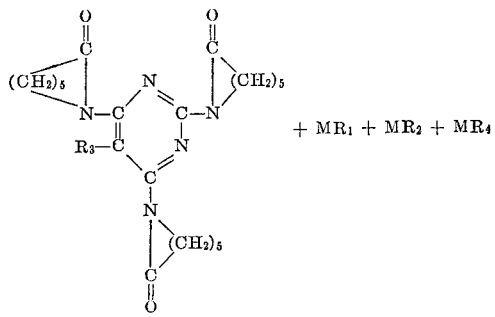

$+ MR_1 + MR_2 + MR_4$ where M has the meaning given above; $R_1$, $R_2$ and $R_4$ are replaceable substituents as defined above, and the pyrimidine product is a 2,4,6-tri-(ε-caproimido) pyrimidine. As previously discussed, $R_3$ is not replaced because of its position on the pyrimidine ring, and it can either be the same as $R_1$ or a substituent inert toward metal salts of caprolactam such as hydrogen or hydrocarbon groups free of olefinic unsaturation. While the above equation illustrates a reaction where all of $R_1$, $R_2$ and $R_4$ are replaceable substituents, it is to be understood that any one or any two of these substituents can be inert toward metal salts of caprolactam, e.g., hydrogen or hydrocarbon groups free of olefinic unsaturation, with the result that no reaction takes place at the corresponding positions.

The reaction between the substituted pyrimidine and the caprolactam metal salt is carried out in an organic diluent, preferably at a temperature of about 50° C. to 120° C. with particularly good results being obtained at about 60° C. to 90° C. The diluent employed can be any dry organic compound which under the reaction conditions is liquid and does not react with any of the other compounds present. Illustrative of suitable diluents are benzene, xylene and toluene. Lactams such as ε-caprolactam can also be used as the diluent. However, if it is desired to isolate the ε-caproimido pyrimidine, care must be taken not to exceed 120° C. and thereby initiate polymerization of the lactam.

The detailed description of our process and the examples which follow set forth particularly the employment of lithium hydride and 2,4,6-trichloropyrimidine in our process, but it is to be understood that these specific compounds and the conditions cited for use therewith are illustrative rather than limiting; and that the same principles and general procedures apply when using other metals or other metal compounds as defined above and when using other pyrimidine derivatives, including in particular 2,4-dichloropyrimidine, 2,4,6-triphenoxypyrimidine and 2,4-diphenoxypyrimidine, and mixed derivations such as the monochloro-diphenoxy pyrimidines, also like pyrimidines, additionally substituted by one or more inert substituents. Illustrative examples of pyrimidines suitable as starting materials for reaction with lactam salts to form the promoters of our invention are:

2,4,6-trichloropyrimidine
2,4,6-trihydroxypyrimidine (barbituric acid)
2,4-dichloropyrimidine
2,4-dibromopyrimidine
2-iodo-6-chloropyrimidine
2-chloro-6-fluoropyrimidine
2,4-dihydroxy-6-methyl pyrimidine
2,4-dihydroxypyrimidine
2-chloro-6-hexoxypyrimidine
2,4,6-trimethoxypyrimidine
2,4,6-triphenoxypyrimidine
5-cyclohexyl-6-bromopyrimidine
2-benzyl-6-chloropyrimidine
4-cyclohexyl-6-bromopyrimidine
2,4-di(methylamino) pyrimidine
2-bromopyrimidine
2,4-dihexoxypyrimidine
2,4-dibenzyloxypyrimidine
2,4-dibenzylaminopyrimidine
2-chloro-4-butyl-6-methoxypyrimidine
2-chloro-4-methyl-6-decyloxypyrimidine
2-chloro-4,5-dibutylpyrimidine
4,5-diphenyl-6-chloropyrimidine
2-hydroxypyrimidine
2,4-diethoxypyrimidine
2,4-dimethoxypyrimidine

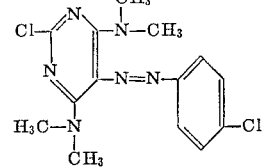

and

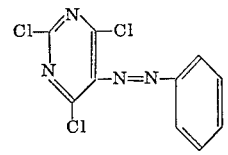

Pyrimidines suitable for use in our process are readily available. For instance, barbituric acid (2,4,6-trihydroxypyrimidine) is available; and this can be converted to 2,4,6-trichloropyrimidine by heating with phosphorus oxychloride, suitably in the presence of dimethylaniline (King et al., Journal of the Chemical Society (London) for 1947, 1247). These chlorides can be converted to alkoxy, phenoxy, etc., pyrimidines by heating with the sodium salt of the appropriate alcohol or phenol.

In one of the best modes contemplated by us for carrying out our invention, the metal salt of ε-caprolactam, e.g., the lithium salt, may be prepared as follows:

Example A

Four liters of distilled, dry xylene and 136 grams (1.2 mols) of distilled, dry caprolactam were introduced into a 5-liter 3-necked flask, heated with an electric mantle, and equipped with a mechanical stirrer, reflux condenser, and the necessary gas lines. A dry nitrogen atmosphere was maintained throughout the operation. The solution was heated to 90°–100° C./750 mm. and under a blanket of dry, oxygen-free nitrogen 7.9 grams (1.0 mol) of lithium hydride was added with stirring. Reaction proceeded as indicated by the evolution of hydrogen and the precipitation of a flocculent solid. The temperature was slowly raised to 140° C. and with stirring the reaction was allowed to continue for 2 hours until the evolution of hydrogen had subsided.

The reaction mixture was cooled to room temperature and filtered under a blanket of dry nitrogen. The isolated precipitate was washed twice with 200 cc. of dry, hot benzene and then heated under reduced pressures for 24 hours at 80°–90° C./5–10 mm. nitrogen. There was obtained 110 grams (92.5% yield) of a white product, melting point 310°–340° C. with decomposition, which was found by infrared and elemental analysis to be the lithium salt of ε-caprolactam (hygroscopic but stable in air, in absence of moisture and carbon dioxide).

The following example is illustrative of our invention and describes a specific embodiment of our invention, but the invention is not to be interpreted as limited to all details of the example.

Example

Thirty grams of essentially pure lithium salt of ε-caprolactam, prepared as in Example A above (0.25 mol), was slurried in dry benzene (500 cc.) and 9.2 grams of 2,4,6-trichloropyrimidine (0.05 mol) was slowly added under dry nitrogen at 70° C. with stirring. After 2 hours at 70° C., the solid residue (excess lithium salt of caprolactam and LiCl) was filtered off. Upon evaporating the benzene at reduced pressure, an oil was obtained to which was added chloroform and ether until a precipitate formed.

The precipitate was low melting; it was filtered off and the solvents were evaporated from the filtrate to leave a viscous oil which crystallized on standing.

It was recrystalized from n-heptane and showed melting point of 148°–154° C. Analysis for carbon, hydrogen and nitrogen closely checked the theoretical for substitution of the three chlorine atoms by three caprolactam residues, e.g. for 2,4,6-tri-(ε-caproimido) pyrimidine. Infrared examination confirmed this identification showing absorption bands for the pyrimidine and ε-caprolactam moieties and absence of bands for chloro-substituents.

We claim:

1. Process for preparing an (ε-caproimido) pyrimidine which comprises mixing together a metal salt of ε-caprolactam, wherein said metal is an alkali metal or an alkaline earth metal, and a pyrimidine which bears on one of its 2-, 4- and 6-positions a substituent attached by a more electronegative atom than the nitrogen of ε-caprolactam and replaceable by metatheses with the metal salt of ε-caprolactam, and on the remainder of its carbon atoms bears such replaceable substituent or hydrogen or a substituent inert toward the metal salt of ε-caprolactam.

2. Process of claim 1, wherein the substituted pyrimidine is added to an alkali metal salt of ε-caprolactam slurried in a dry, inert diluent and maintained under a dry, inert atmosphere at a temperature of about 50°–120° C.

3. Process of claim 2, wherein the metal salt is the lithium salt of ε-caprolactam.

4. Process of claim 1, wherein said pyrimidine has substituents on the 2-, 4- and 6-positions which are selected from the group consisting of chloro, methoxy and phenoxy.

5. The compound 2,4,6-tri-(ε-caproimido) pyrimidine.

References Cited

UNITED STATES PATENTS 3,249,590   5/1966   Pietrusza et al. ____ 260—239.3

HENRY R. JILES, *Primary Examiner.*

R. T. BOND, *Assistant Examiner.*